Patented May 28, 1935

2,002,656

UNITED STATES PATENT OFFICE 2,002,656

PROCESS FOR THE PRODUCTION OF CALCIUM CARBAMATE

Nikodem Caro, Berlin-Dahlem, Albert Rudolph Frank, Berlin-Halensee, and Hans Heinrich Franck, Berlin-Charlottenburg, Germany No Drawing. Application August 22, 1931, Serial No. 558,848. In Germany February 8, 1929

8 Claims. (Cl. 260—112)

This invention relates to a process for the production of calcium carbamate.

It is known from the work carried out by Drechsel (Journal für praktische Chemie 1877, page 188) that from ammonia water, carbon dioxide, and milk of lime there can be obtained, by maintaining very strict conditions, a solution from which a certain portion of the lime employed can be crystallized out as calcium carbamate by pouring in the same volume of absolute alcohol at 0° C. This process is only a laboratory one and obviously is not suitable for technical use on a large scale. It has further been proposed to treat metal salts dissolved in liquid ammonia with carbon dioxide and in this way to obtain carbamates.

According to this invention a particularly simple process of producing calcium carbamate has been found which consists in reacting aqueous ammoniacal solutions of ammonium carbamate, the water content of which is as low as possible and which can be saturated with ammonia and carbon monoxide or with ammonium carbamate by cooling and/or applying pressure or adding solid ammonium carbamate at temperatures between 40° C. and temperatures at which ammonium carbamate is still stable, i. e. about —20° C., with calcium compounds such as calcium oxide or calcium hydroxide, calcium chloride, calcium nitrate and the like, either in solution or in suspension, and cooling the resulting solutions, if necessary, for example to —10° C., whereby calcium carbamate is precipitated. If the calcium compounds are added in solid form, temperatures between 20–30° C. are advisable if it is desired to obtain clear solutions. The temperature may be somewhat higher if the operation is effected under ammonia pressure. The reaction proceeds according to the equation:

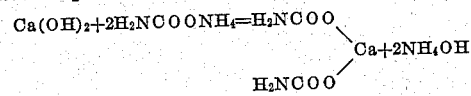

On cooling the solution, resulting from the above double decomposition, to a low temperature, calcium carbamate separates out in an amount depending upon the anions employed and the somewhat varied conditions of solubility. The pressure can be either released or the system left under pressure. The salt which separates out may or may not contain water of crystallization, depending on the water concentration of the ammoniacal mother liquor.

The following example illustrates how the process of the invention may be carried into effect:

A solution of ammonium carbamate is prepared by saturating a small quantity of water at 25° C. under pressure with ammonia and carbon dioxide, for example in the proportion of 2:1. A concentrated solution of calcium chloride is then pumped into this ammonium carbamate solution whilst still maintained in the same vessel the ammonium carbamate being present in an amount in excess of that required to combine with the calcium chloride. Calcium carbamate is immedately formed at the temperature indicated. On cooling the solution to —8° to —10° C., about 80–90% of the calcium employed is precipitated as carbamate. The excess of ammonia and carbon dioxide present after the formation of the calcium carbamate serves to "salt out" the calcium carbamate produced. The mother liquor may be employed in a cycle by again saturating the liquor in the pressure vessel with ammonia and carbon dioxide or by treating the liquor with solid ammonium carbamate.

Calcium hydroxide, in the form of milk of lime or suspensions of slaked lime, may be converted in a similar manner to calcium carbamate. In this case the conditions are particularly favourable as very highly concentrated solutions of calcium carbamate are readily obtained. Calcium nitrate may also be employed.

The term "saturated aqueous ammoniacal solutions" is intended to imply solutions of water in ammonia.

We claim:

1. A process for producing calcium carbamate which consists in treating saturated aqueous ammoniacal solutions of ammonium carbamate at temperatures between 40° C. and about —20° C. with calcium compounds soluble in the liquid phase, in cooling the solutions and removing calcium carbamate.

2. A process for producing calcium carbamate which consists in treating saturated aqueous ammoniacal solutions of ammonium carbamate at temperatures between 40° C. and about —20° C. with suspensions of calcium hydroxide, in cooling the solutions, and in removing calcium carbamate.

3. A process for producing calcium carbamate which consists in treating saturated aqueous ammoniacal solutions of ammonium carbamate at temperatures between 40° C. and about —20° C. with suspensions of calcium hydroxide, in cooling the solutions to about —10° C., and in removing calcium carbamate.

4. A process as specified in claim 1, wherein the mother liquor from the calcium carbamate separation is reintroduced into the cycle, saturated with ammonia and carbon dioxide in the ratio of about 2 : 1, and then caused to react with a calcium salt, soluble in the liquid phase, said ammonia and carbon dioxide being employed in a quantity in excess of that required to combine with the calcium salt.

5. A process as specified in claim 1, wherein the mother liquor from the calcium carbamate separation is reintroduced into the cycle, saturated with solid ammonium carbamate, and then caused to react with a calcium salt soluble in the liquid phase, said solid ammonium carbamate being employed in a quantity in excess of that required to combine with the calcium salt.

6. In the production of carbamate of calcium the improvement which comprises causing ammonium carbamate to react with a calcium compound in an aqueous ammoniacal solution, and precipitating the carbamate of calcium by cooling the solution to a temperature below about 10° C.

7. In the production of carbamate of calcium the improvement which comprises carbonating an aqueous ammoniacal solution of a calcium compound while maintaining a ratio of $CO_2$ to $NH_3$ of 0.5, and precipitating the carbamate of calcium by cooling the solution to a temperature below about 10° C.

8. In the production of carbamate of calcium the improvement which comprises adding a calcium compound to an aqueous ammoniacal solution of ammonium carbamate, and precipitating the carbamate of calcium by cooling the solution to a temperature below about 10° C.

ALBERT RUDOLPH FRANK.
NIKODEM CARO.
HANS HEINRICH FRANCK.